(12) United States Patent
Li

(10) Patent No.: US 11,348,115 B2
(45) Date of Patent: May 31, 2022

(54) METHOD AND APPARATUS FOR IDENTIFYING RISKY VERTICES

(71) Applicant: Advanced New Technologies Co., Ltd., Grand Cayman (KY)

(72) Inventor: Na Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/323,549

(22) Filed: May 18, 2021

(65) Prior Publication Data

US 2021/0357942 A1 Nov. 18, 2021

Related U.S. Application Data

(63) Continuation of application No. PCT/CN2020/070505, filed on Jan. 6, 2020.

(30) Foreign Application Priority Data

Mar. 8, 2019 (CN) .......................... 201910176626.0

(51) Int. Cl.
  *G06Q 20/40* (2012.01)
  *G06F 16/901* (2019.01)
  *G06F 17/15* (2006.01)
  *G06Q 20/38* (2012.01)

(52) U.S. Cl.
  CPC ..... *G06Q 20/4016* (2013.01); *G06F 16/9024* (2019.01); *G06F 17/15* (2013.01); *G06Q 20/382* (2013.01); *G06F 2101/10* (2013.01)

(58) Field of Classification Search
  CPC .............. G06Q 20/382; G06Q 20/4016; G06F 16/9024; G06F 17/15; G06F 2101/10
  USPC ........................................................ 705/75
  See application file for complete search history.

(56) References Cited

U.S. PATENT DOCUMENTS

| | | | |
|---|---|---|---|
| 10,831,452 B1 * | 11/2020 | Hunter | G06F 16/9024 |
| 2017/0018034 A1 * | 1/2017 | Wainman | G06F 16/9024 |
| 2018/0053188 A1 | 2/2018 | Zoldi et al. | |
| 2019/0019193 A1 | 1/2019 | Isaiah | |

FOREIGN PATENT DOCUMENTS

| | | |
|---|---|---|
| CN | 102722814 A | 10/2012 |
| CN | 105046562 A | 11/2015 |
| CN | 106850346 A | 6/2017 |
| CN | 107292424 A | 10/2017 |
| CN | 107871277 A | 4/2018 |

(Continued)

*Primary Examiner* — Tan V Mai
(74) *Attorney, Agent, or Firm* — Seed IP Law Group LLP

(57) ABSTRACT

The present specification provides a method for identifying risky vertices, including: constructing multiple medium networks, each of the multiple medium networks being constructed from one or more black seeds of the same type and including vertices and media connected to the vertices; determining a first risk value of each vertex based on a quantity of upper-layer media connected to the vertex and a quantity of risk conditions that the vertex meets; determining a final risk value of each vertex based on a quantity of overlapping times of the vertex in a stacked medium network structure and the first risk value; and determining a high-risk vertex based on the final risk value.

21 Claims, 8 Drawing Sheets

Solution flowchart

(56) References Cited

FOREIGN PATENT DOCUMENTS

| | | |
|---|---|---|
| CN | 108446988 A | 8/2018 |
| CN | 109272323 A | 1/2019 |
| CN | 110110954 A | 8/2019 |
| TW | M560642 U | 5/2018 |

\* cited by examiner

METHOD AND APPARATUS FOR IDENTIFYING RISKY VERTICES

BACKGROUND

Technical Field

The present specification relates to the service security field, and in particular, to a method and apparatus for identifying risky vertices.

Description of the Related Art

Transaction risks commonly exist in various transactions, ranging from a wet market transaction in which a wrong merchant QR code is scanned to pay a wrong account, to a corporate transaction in which a counterparty defaults for various reasons, causing a huge fund loss. Some risks occur for objective reasons or unintentional reasons. For example, risk contagion of a financial crisis causes counterparty's mismanagement and default. Other risks occur for subjective reasons. For example, a counterparty intentionally directs a wrong transaction, causing a fund loss. However, when determining whether a transaction is risky, it is not only necessary to trace real information and purposes of both transaction parties, but also necessary to consider all risk-associated parties.

Currently, there are the following risk-associated party identification solutions:

1. Connected-graph-based identification model: A connected graph can be classified as a single-factor medium graph or a multi-factor medium graph by defining different media, and is expanded and connected indefinitely by using a black seed as a start point. However, the following disadvantages exist in construction of such a graph structure:

a. Restricted vertex customization expansion: After a connection relationship and a medium definition are determined, if a risk form changes or the expert method customizes to add or delete any logic, the connected graph cannot be expanded flexibly.

b. Restricted computational efficiency: For a complex dynamic fund relationship change, the connected graph has relatively low computational efficiency due to data magnitude and complexity, as well as restricted computing resources.

c. Restricted multi-scenario switchover: For the connected graph, a universal large graph usually can be constructed, or a large graph can be formed by cutting small graphs. After the graph is constructed, it is relatively difficult to perform personalized profiling based on different application scenarios or perform multiple-scenario cross, or it is relatively difficult to reuse the graph.

2. Device-associated reverse check: A device is usually an electronic device used for a risky transaction, such as a computer, a mobile phone, or a calling card. Because the value of the device is usually higher than the value of other criminal tools, the device has relatively high reusability and a relatively long service life. More criminal accounts can be reversely checked by associating a known black device. However, such a method has the following disadvantages:

a. An inaccurate (suspected) device causes a steep decline in accuracy of subsequent associated reverse check: Some black devices may be purchased from secondary markets and are not new devices. A high-quality customer may be mixed into users reversely checked by associating such a device. If second or third association is further performed, accuracy of a result of the further association declines linearly because a quantity of social relationships (daily interactions) of the high-quality customer is far greater than a quantity of social relationships of the criminal account.

b. Low accuracy of mixed devices: Because the device usually has relatively high value, multiple risk entities may be mixed for use. For example, if fraudulent criminal devices are mixed with gambling criminal devices for use, because a quantity of gambling accounts usually may be greater than a quantity of fraudulent accounts, an overall percentage and accuracy of fraudulent accounts may decline after associated reverse check.

Therefore, it is expected that risk-associated parties can be effectively identified so that all the risk-associated parties can be identified and managed before a transaction risk occurs.

BRIEF SUMMARY

In the present specification, a high-risk vertex (such as a high-risk account) is identified before a transaction risk occurs, so that the high-risk vertex can be monitored in real time to effectively prevent risk occurrence.

The present specification provides a method for identifying risky vertices, including: constructing multiple medium networks, each of the multiple medium networks being constructed from one or more black seeds of the same type and including vertices and media connected to the vertices; determining a first risk value of each vertex based on a quantity of upper-layer media connected to the vertex and a quantity of risk conditions that the vertex meets; stacking the multiple medium networks; determining a final risk value of each vertex based on a quantity of overlapping times of the vertex in a stacked medium network structure and the first risk value; and determining a high-risk vertex based on the final risk value.

In some implementations, the constructing the multiple medium networks includes: generating one or more initial seeds; matching media in a medium pool with the one or more initial seeds to generate one or more initial media; and outputting the one or more initial seeds and the one or more initial media to construct the medium networks.

In some implementations, the matching the media in the medium pool with the one or more initial seeds includes: determining whether each medium of the media is associated with one or more of the one or more initial seeds; determining a ratio between a quantity of initial seeds associated with the medium and a total quantity of initial seeds; and determining the medium to be an initial seed if the ratio is greater than a threshold.

In some implementations, the determining the first risk value of each vertex based on the quantity of upper-layer media connected to the vertex and the quantity of risk conditions that the vertex meets includes: determining an initial risk value of each vertex based on the quantity of upper-layer media connected to the vertex; and determining a second risk value of each vertex based on the quantity of risk conditions that the vertex meets and the initial risk value.

In some implementations, the initial risk value of the vertex is a logarithmic function of the quantity of upper-layer media connected to the vertex.

In some implementations, the determining the second risk value of each vertex based on the quantity of risk conditions that the vertex meets includes: determining the quantity of risk conditions that the vertex meets; and determining the second risk value of the vertex based on the quantity of risk conditions that the vertex meets and the initial risk value.

In some implementations, the determining the second risk value of the vertex based on the quantity of risk conditions that the vertex meets and the initial risk value further includes: determining a layer number of the vertex; and determining the second risk value of the vertex based on the layer number of the vertex, the quantity of risk conditions that the vertex meets, and the initial risk value.

In some implementations, the layer number of the vertex is a quantity of media between the vertex and the black seed.

In some implementations, the method further includes: comparing a risk value of each boundary vertex with risk values of upstream vertices of the boundary vertex; and if the risk value of the boundary vertex is greater than a risk value of any of the upstream vertices, adjusting the risk values of the upstream vertices of the boundary vertex to cause each of the risk values of the upstream vertices to be greater than or equal to the risk value of the boundary vertex.

In some implementations, the obtaining the final risk value of each vertex in the stacked medium network includes: increasing a risk value of an overlapped vertex based on a quantity of overlapping times of the vertex.

Another aspect of the present specification provides an apparatus for identifying risky vertices, including: a module configured to construct multiple medium networks, each of the multiple medium networks being constructed from one or more black seeds of the same type and including vertices and media connected to the vertices; a module configured to determine a first risk value of each vertex based on a quantity of upper-layer media connected to the vertex and a quantity of risk conditions that the vertex meets; a module configured to stack the multiple medium networks; a module configured to determine a final risk value of each vertex based on a quantity of overlapping times of the vertex in a stacked medium network structure and the first risk value; and a module configured to determine a high-risk vertex based on the final risk value.

In some implementations, the module configured to construct the multiple medium networks includes: a module configured to generate one or more initial seeds; a module configured to match media in a medium pool with the one or more initial seeds to generate one or more initial media; and a module configured to output the one or more initial seeds and the one or more initial media to construct the medium networks.

In some implementations, the module configured to the match the media in the medium pool with the one or more initial seeds includes: a module configured to determine whether each medium of the media is associated with one or more of the one or more initial seeds; a module configured to determine a ratio between a quantity of initial seeds associated with the medium and a total quantity of initial seeds; and a module configured to determine the medium to be an initial seed if the ratio is greater than a threshold.

In some implementations, the module configured to determine the first risk value of each vertex based on the quantity of upper-layer media connected to the vertex and the quantity of risk conditions that the vertex meets includes: a module configured to determine an initial risk value of each vertex based on the quantity of upper-layer media connected to the vertex; and a module configured to determine a second risk value of each vertex based on the quantity of risk conditions that the vertex meets and the initial risk value.

In some implementations, the initial risk value of the vertex is a logarithmic function of the quantity of upper-layer media connected to the vertex.

In some implementations, the module configured to determine the second risk value of each vertex based on the quantity of risk conditions that the vertex meets includes: a module configured to determine the quantity of risk conditions that the vertex meets; and a module configured to determine the second risk value of the vertex based on the quantity of risk conditions that the vertex meets and the initial risk value.

In some implementations, the module configured to determine the second risk value of the vertex based on the quantity of risk conditions that the vertex meets and the initial risk value further includes: a module configured to determine a layer number of the vertex; and a module configured to determine the second risk value of the vertex based on the layer number of the vertex, the quantity of risk conditions that the vertex meets, and the initial risk value.

In some implementations, the layer number of the vertex is a quantity of media between the vertex and the black seed.

In some implementations, the apparatus further includes: a module configured to compare a risk value of each boundary vertex with risk values of upstream vertices of the boundary vertex; and a module configured to: if the risk value of the boundary vertex is greater than a risk value of any of the upstream vertices, adjust the risk values of the upstream vertices of the boundary vertex to cause each of the risk values of the upstream vertices to be greater than or equal to the risk value of the boundary vertex.

In some implementations, the module configured to obtain the final risk value of each vertex in the stacked medium network includes: a module configured to increase a risk value of an overlapped vertex based on a quantity of overlapping times of the vertex.

Another aspect of the present specification provides a computer device, including: a processor; and a memory arranged to store computer executable instructions, the processor being caused to perform the following operations when the executable instructions are executed: constructing multiple medium networks, each of the multiple medium networks being constructed from one or more black seeds of the same type and including vertices and media connected to the vertices; determining a first risk value of each vertex based on a quantity of upper-layer media connected to the vertex and a quantity of risk conditions that the vertex meets; stacking the multiple medium networks; determining a final risk value of each vertex based on a quantity of overlapping times of the vertex in a stacked medium network structure and the first risk value; and determining a high-risk vertex based on the final risk value.

The medium network construction and high-risk node identification of the present specification can be applied to various scenarios for determining risky transactions such as a forbidden risk, a fraud risk, and a marketing risk, and can achieve significant effects.

DETAILED DESCRIPTION

Figure 1:
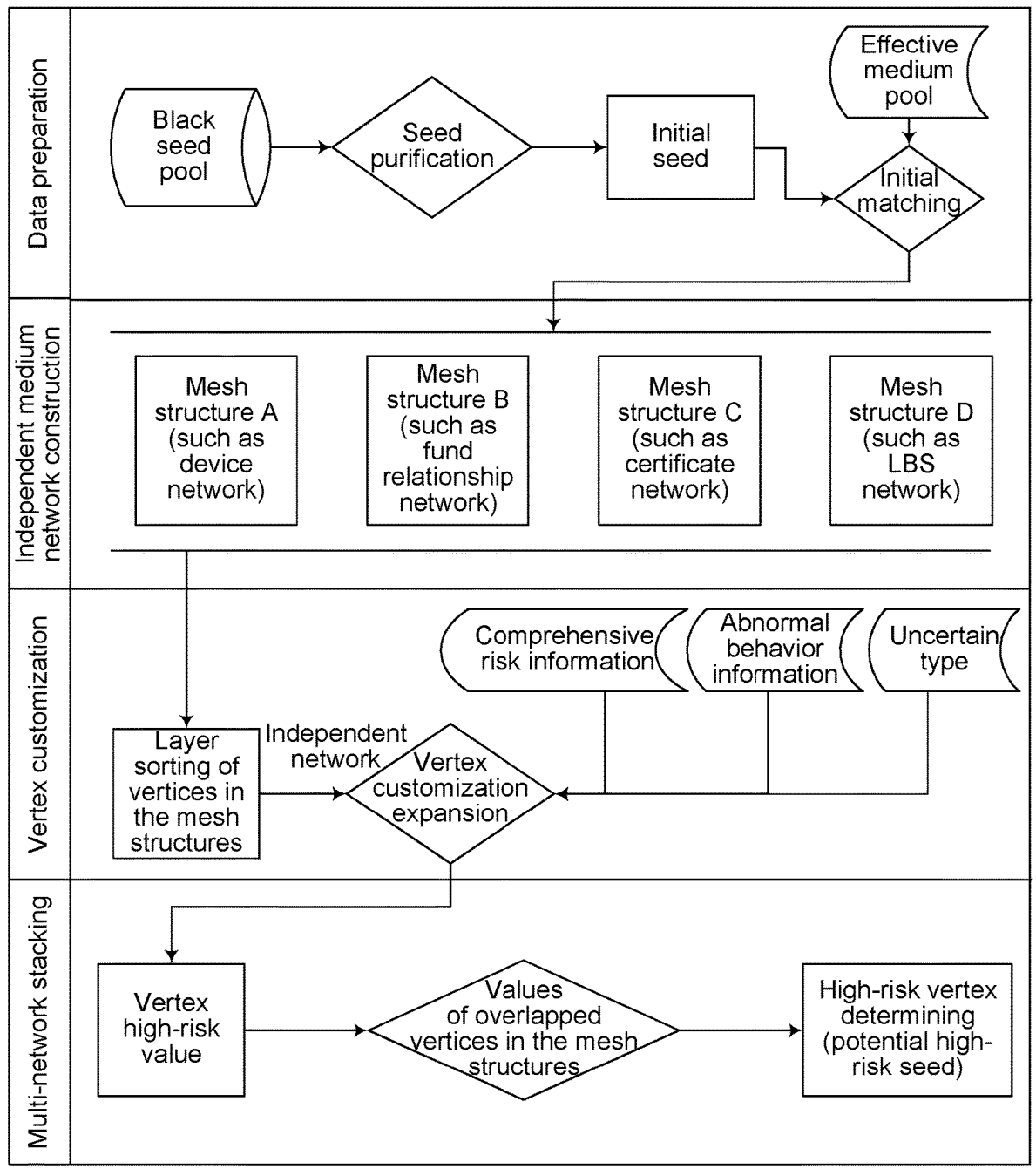
FIG. 1 is a schematic diagram illustrating a method for identifying risky vertices according to the present specification.

To make the above objects, features, and advantages of the present specification clearer and easier to understand, the following describes specific implementations of the present specification in detail with reference to the accompanying drawings.

Many details are described in the following description, to facilitate comprehensive understanding of the present specification. However, the present specification can be implemented in ways other than the ways described herein. Therefore, the present specification is not limited to the specific implementations disclosed in the following.

Specifically, the inventor of the present application finds, by analyzing a large quantity of data samples, that for both parties of most transaction events, a risk degree of risky behavior prior to a transaction can be determined by constructing and updating a mesh structure of various media in real-time and iteratively identifying overlapping degrees of vertices. For example, a communications medium (such as a mobile phone or a phone) can be monitored to identify whether both parties know each other, a device medium (such as a computer or a smartphone) can be monitored to identify whether different accounts are operated on a same device, and a location (such as an LBS (location based service)) medium can be monitored to determine whether both transaction parties are at close geographical locations. These media can be monitored and mixed in a concurrent fashion to prevent aberrations due to time differences, so as to constitute a meaningful interleaved mesh structure or multiple independent mesh structures that are updated constantly to reflect most update-to-date conditions for real-time risk identification prior to any transactions. Illustratively, if a certain vertex is associated with multiple media in a mesh structure, a high-risk degree of the vertex increases, and a risk of a transaction associated with the vertex naturally increases.

With the popularization of communications tools and social media, a wide range of social networks has been formed. Each entity (such as an individual or an enterprise) has various accounts (such as a bank account, a mobile number, an ALIPAY account, and a WeChat account), and the entity can communicate with other entities by using media (such as Phone, Messaging, WeChat, and Microblog). By monitoring each entity's accounts, communication, and/or media used, a medium network can be constructed and updated in real-time to represent these interactions and associations between entities, which may vary and evolve from one moment to another.

The medium network includes vertices and media connected to the vertices.

The vertex is an identity identifier used by an entity in an interaction (for example, a transaction), such as an account (such as a bank account, a mobile number, an ALIPAY account, or a WeChat account).

The medium represents a means of interaction between entities, such as bank transfer, Phone, Messaging, WeChat, or Microblog.

For example, if two entities have communicated with each other by using mobile phones, mobile number vertices of the two entities can be connected by using a mobile phone communications medium.

In another example, if two entities have bank transfer records, bank account vertices of the two entities can be connected by using a bank transfer medium.

In still another example, if two entities have been used on the same device, device vertices of the two entities can be connected by using a device medium.

In a further example, if two entities have been present at the same location, location vertices of the two entities can be connected by using an LBS (location based service) medium.

Each vertex in the medium network can have a risk value, which can be updated in real-time based on changes and updates to the medium network. The risk value can represent the probability, determined at the current point of time, that the vertex is a dangerous entity (such as a fraudulent entity or an impersonated entity). Each vertex in the medium network usually can include one or more types of risk values (such as a fraud risk value and an impersonation risk value). A value of a vertex about a certain type of risk can represent the probability of risk occurrence with the vertex, as determined at the current point of time.

A medium network is usually constructed from a black seed. A type of the black seed (also referred to as a seed) is the same as a type of a vertex (such as a bank account, a mobile number, an ALIPAY account, or a WeChat account) in the medium network, and the black seed represents an entity that has been determined to have a certain type of risk, such as an entity with poor credit or with a fraud, embezzlement, or impersonation history.

In the present specification, multi-media (or multi-path) association with a black seed, an additional risk feature, a degree of association with the black seed, a vertex overlapping degree during stacking of multiple medium networks are considered concurrently in determining a risk value of a vertex in a medium network, so that the risk value can be more accurately determined, to more accurately identify a high-risk vertex, in real-time and prior to potential transactions.

FIG. 1 is a schematic diagram illustrating a method for identifying risky vertices according to the present specification.

As shown in FIG. 1, a solution for identifying risky vertices in the present specification can be divided into the following four parts:

The first part is data preparation: Initial seeds and media (also referred to as initial media) that match the initial seeds are provided for subsequent modules.

Specifically, initial seeds available for medium network construction are extracted from a black seed pool (seed purification), the initial seeds are matched with media in an effective medium pool, and media associated with the initial seeds are determined to be initial media.

The second part is independent medium network construction and vertex initial value assignment: Multiple independent medium networks are constructed by using the initial seeds and the initial media generated in the first part, and an initial risk value of each vertex is determined.

For example, medium network A can be constructed for a mobile number, medium network B can be constructed for a bank account, medium network C can be constructed for an ALIPAY account, and medium network D can be constructed for location information. These medium networks can be constructed in parallel, e.g., using different sets of processors, clusters, and/or virtual machines, and based on most up-to-date status of the mobile number, bank account, ALIPAY account, and location as constantly monitored.

The third part is vertex customization (i.e., vertex risk value optimization): Other expansion information is used to perform risk value optimization based on the initial risk value, to determine a second risk value of the vertex.

For example, the initial risk value can be optimized based on a state in which the vertex meets other risks and in some implementations based on a layer number of the vertex, to obtain the second risk value.

The fourth part is multi-network stacking: The multiple independent medium networks are stacked together, and a multi-media structure is constructed for an overlapped vertex to form a multilateral structure. A third risk value is determined for a vertex in the multi-media structure, to obtain a final risk value. A potential high-risk vertex is determined based on the final risk value. Further, the high-risk vertex can be added to the black seed pool based on final risk value distribution and expert experience, to form a complete benign identification system.

The third part and/or fourth part can be interactively repeated or otherwise triggered for updating based on real-time changes to the networks in accordance with concurrently monitored status of the different media. In some embodiments, various functions related to at least a subset of the monitoring of media, updating of media networks, the third part, and the fourth part can be performed in parallel. For example, working concurrently and in parallel, a first set of processors, clusters, and/or virtual machines can be used to monitor media, a second set of processors, clusters, and/or virtual machines can be used to update the media networks, a third set of processors, clusters, and/or virtual machines can be used to perform the third part, and a fourth set of processors, clusters, and/or virtual machines can be used to perform the fourth part. In some embodiments, the performing of the third and/or fourth part can be interrupted, paused, resumed, and/or re-initialized due to significant changes (e.g., beyond a threshold value) in the media as monitored or significant changes (e.g., beyond a threshold number of vertices and/or edges) in the structure or weight of medium network(s) as updated.

Figure 2:
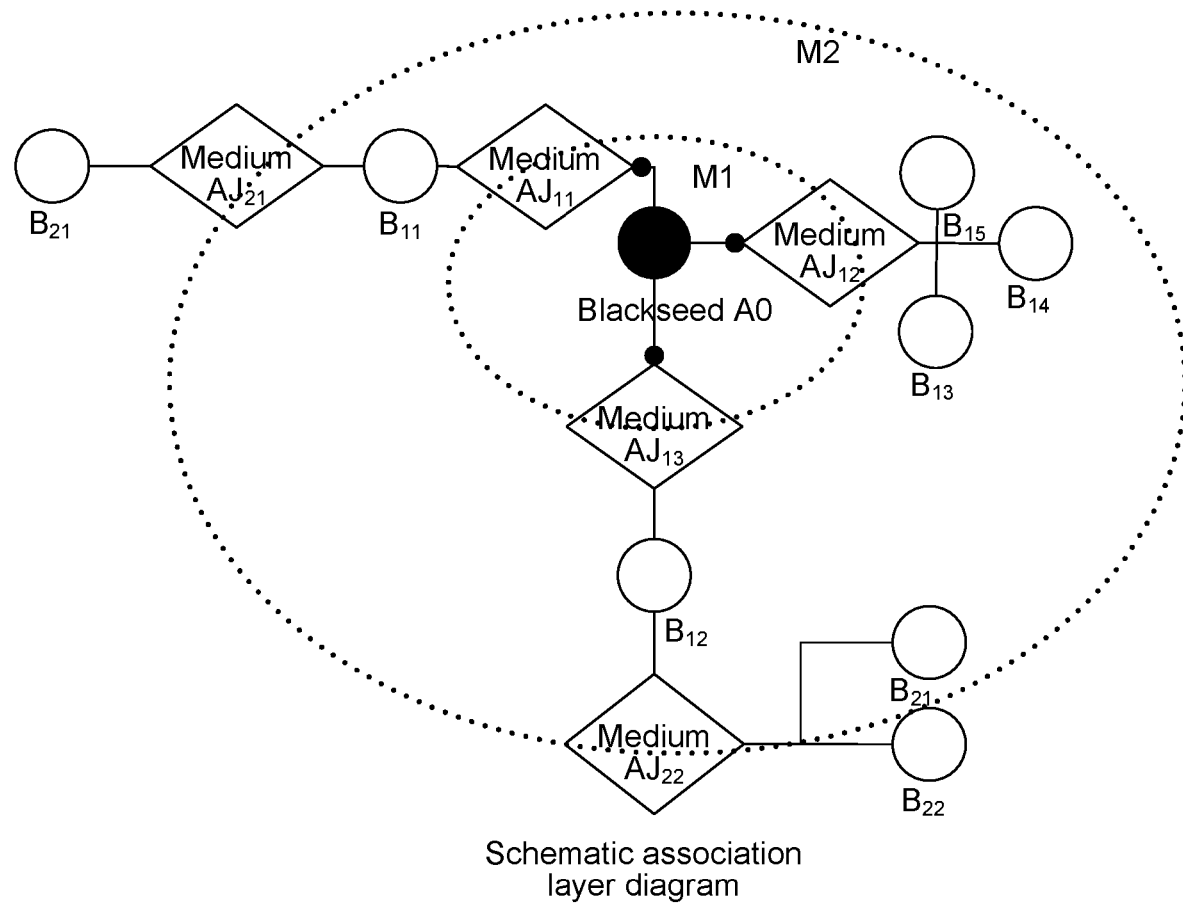
FIG. 2 is a schematic diagram illustrating a medium network according to aspects of the present specification.

FIG. 2 is a schematic diagram illustrating a medium network according to aspects of the present specification.

As shown in FIG. 2, the medium network is constructed by using black seed (initial seed) A0 as a start point, and black seed A0 is connected to associated media $AJ_{11}$, $AJ_{12}$, and $AJ_{13}$.

Black seed A0 is associated with vertex $B_{11}$ by using medium $AJ_{11}$, is associated with vertices $B_{13}$, $B_{14}$, and $B_{15}$ by using medium $AJ_{12}$, and is associated with vertex $B_{12}$ by using medium $AJ_{13}$. Therefore, in the medium network, medium $AJ_{11}$ is connected to associated vertex $B_{11}$, medium $AJ_{12}$ is connected to associated vertices $B_{13}$, $B_{14}$, and $B_{15}$, and medium $AJ_{13}$ is connected to associated vertex $B_{12}$. Media $AJ_{11}$, $AJ_{12}$, and $AJ_{13}$ and vertices $B_{11}$, $B_{12}$, $B_{13}$, $B_{14}$, and $B_{15}$ belong to first layer M1 of the medium network.

Vertex $B_{11}$ is further associated with vertex $B_{21}$ by using medium $AJ_{21}$, and vertex $B_{12}$ is further associated with vertices $B_{22}$ and $B_{23}$ by using medium $AJ_{22}$. Therefore, in the medium network, vertex $B_{11}$ is connected to associated vertex $B_{21}$ by using medium $AJ_{21}$, and vertex $B_{12}$ is connected to vertices $B_{22}$ and $B_{23}$ by using medium $AJ_{22}$. Media $AJ_{21}$ and $AJ_{22}$ and vertices $B_{21}$, $B_{22}$, and $B_{23}$ belong to second layer M2 of the medium network.

For purposes of illustration, the first number of a reference sign of a medium/vertex in FIG. 2 represents a layer that the medium/vertex is located in, and the second number represents a number of the medium/vertex in the layer that the medium/vertex is located in. For example, vertex $B_{13}$ represents the third vertex in layer 1.

In the present specification, upstream is a direction close to a black seed (an initial seed), and downstream is a direction away from the black seed.

It can be learned that in the medium network, the vertices are connected by using the media, and the medium network is expanded from the black seed. In the medium network, layer number M of a vertex is a quantity of media (also referred to as upstream media) on the path between the vertex and the black seed, and layer number M of a medium is a quantity of media on the path between the medium and the black seed plus 1.

When there are multiple black seeds in one medium network, there are different quantities of media on paths from a specific vertex to the black seeds. In this case, layer number M of the vertex is the largest quantity of upstream media in the quantities.

Figure 3:
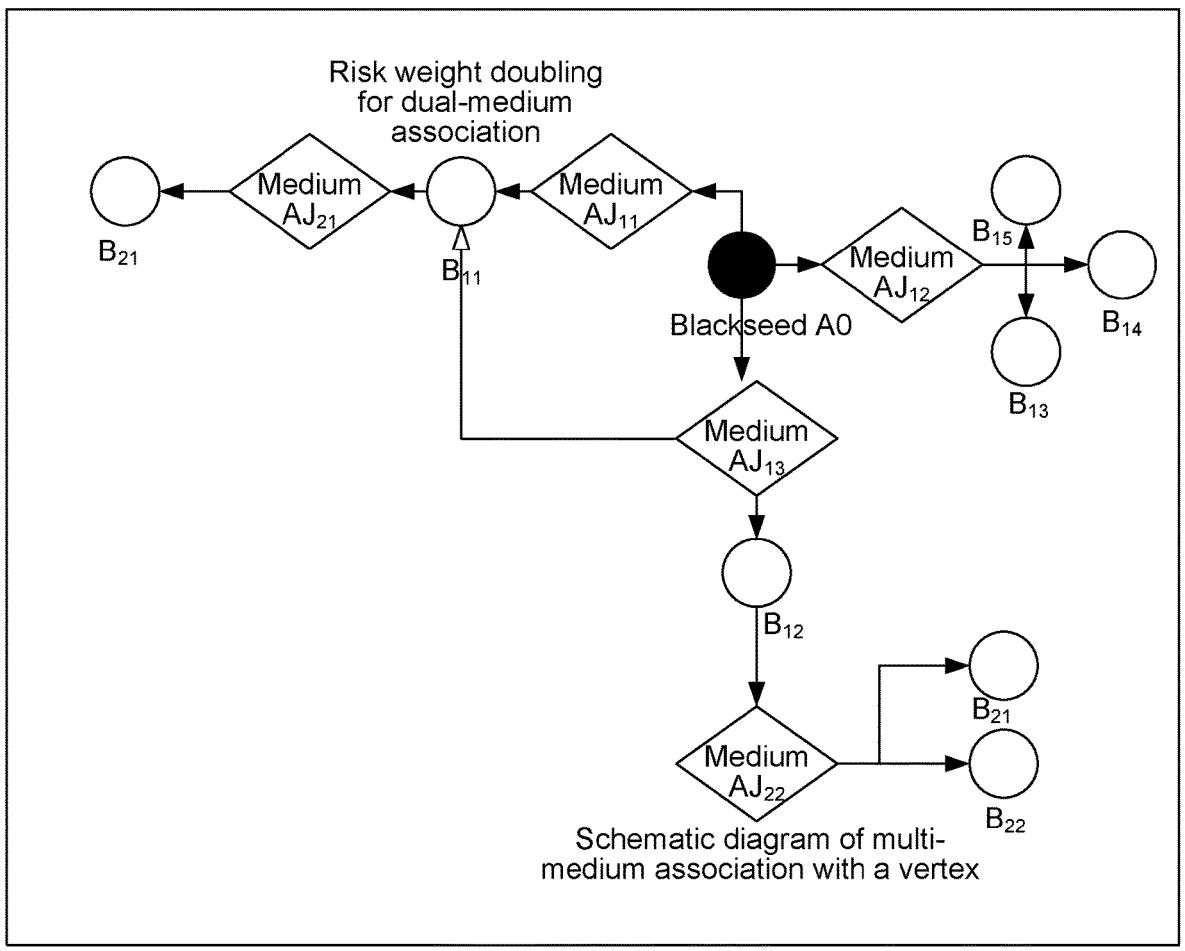
FIG. 3 is a schematic diagram illustrating that one vertex is associated with multiple media according to aspects of the present specification.

FIG. 3 is a schematic diagram illustrating that one vertex is associated with multiple media according to aspects of the present specification.

As shown in FIG. 3, vertex $B_{11}$ is connected to two upstream media $AJ_{11}$ and $AJ_{13}$, which indicates that an entity represented by vertex $B_{11}$ is associated with black seed A0 by using $AJ_{11}$ and $AJ_{13}$. Therefore, a risk value of vertex $B_{11}$ can be increased (for example, doubled or logarithmically doubled (e.g., ln2)).

The following describes in detail a method for identifying risky vertices according to the present specification. As described above, the solution for identifying risky vertices can be divided into four parts: data preparation, independent medium network construction, vertex customization, and multi-network stacking. The following separately describes the four parts in detail.

Data Preparation

Data preparation includes preparing initial seeds and initial media used for medium network construction.

Figure 4:
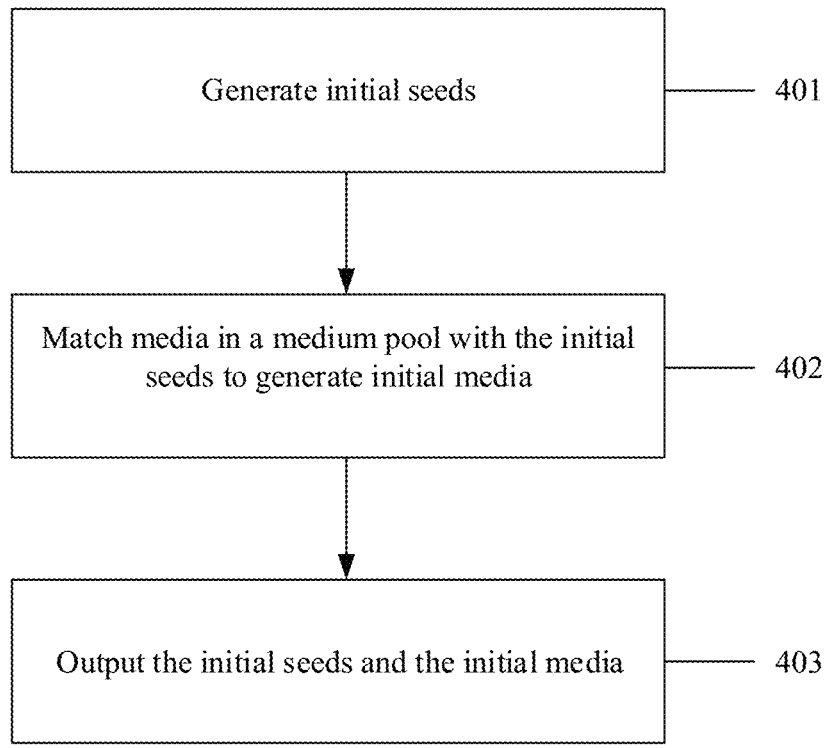
FIG. 4 is a flowchart illustrating a data preparation method according to aspects of the present specification.

FIG. 4 is a flowchart illustrating a method for preparing seeds and media used for medium network construction.

Step 401: Generate initial seeds. The initial seed can be black seed A0 shown in FIG. 2 and FIG. 3.

Specifically, the initial seeds can be selected from a black seed pool. The black seed pool is a seed pool formed based on a certain risk or a multi-risk set, and includes entities having been determined to have bad behavior, such as an entity account that has a bad record in the current service system, and a user account corresponding to a court's list of dishonest persons subject to enforcement or a public security bureau's list of case involved persons.

For example, for a fraud risk, the black seed pool can include a case that is tipped off by a user and is qualitative, a case pushed by a public security department, and a case involved in news reporting. Some embezzlement and impersonation cases can be further incorporated into the black seed pool. A huge single-risk or multi-risk comprehensive black seed pool is formed over time.

Seed purification can be performed on the black seed pool to generate the initial seeds used for medium network construction.

Specifically, not all seeds in the black seed pool are active seeds or effective seeds, and an ineffective or interfering seed can be removed to improve accuracy of a meshed medium structure.

The following factors can be considered in seed purification: active account time, account behavior mutation, account environment variability, etc.

The active account time means that historical transactions of accounts associated with some seeds are white (that is, the accounts are good accounts in history, for example, normal accounts without a complaint in history) but are inactive for a current period of time. Such an association is an infective association. If such a seed is used to construct a medium network, infinite expansion may be caused due to whiteness of historical transactions. Therefore, such a seed can be removed.

The account behavior mutation indicates that accounts associated with some seeds are good accounts in history but suddenly become bad accounts. The accounts can also be retained as initial seeds.

Account environment variability means that accounts associated with some seeds are previously operated on good devices but suddenly operated on bad devices. It indicates that the accounts are very likely to be embezzled. The accounts can also be retained as initial seeds.

Step 402: Match media in a medium pool with the initial seeds to generate initial media.

The initial media are media directly associated with (connected to) the initial seeds, for example, media $AJ_{11}$, $AJ_{12}$, and $AJ_{13}$ directly connected to black seed A0 shown in FIG. 2 and FIG. 3.

There is a relatively wide range of media. In a risky transaction, any substance used to propagate a risk can be a medium. The medium pool is usually obtained based on collection and summarization of expert experience of specific risks. For example, effective media commonly used in practice include a bank card (such as a debit card), an ALIPAY account, a mobile number, a social account (such as a QQ or WeChat account), and a certificate.

Media in an effective medium pool can be matched with the initial seeds generated in step 401, to select media used for medium network construction. Specifically, whether the media in the effective medium pool match the initial seeds can be determined based on whether the media in the effective medium pool are effectively associated with the initial seeds, and media that match the initial seeds are selected as the initial media.

For example, there are N*M association relationships between N initial seeds and M media, but not all the association relationships are effective. For example, if an initial seed is an income card account with no mobile number registered, and a medium is a mobile phone communications medium, because the income card does not directly match a mobile number, it can be considered that the income card does not match the mobile phone communications medium.

Whether a medium can be used as an initial medium can be determined based on a matching rate between the medium and the initial seeds. The matching rate is a ratio between a quantity of initial seeds that the medium matches and a total quantity of initial seeds (a total quantity of initial seeds generated in step 401). A medium with a relatively high matching rate (for example, the matching rate is higher than a threshold) with the initial seeds usually can be selected as an effective medium used for medium network construction.

For example, if a quantity of initial seeds that a medium matches is higher than 40% of the total quantity of initial seeds, it can be considered that such a medium is effective and can be stored for medium network construction.

Further, mapping relationships between the initial seeds and one or more associated initial media can be established for medium network construction, as described below.

Step 403: Output the initial seeds and the initial media for medium network construction.

Specifically, the initial seeds generated in step 401, media that match the seeds in step 402, and mapping thereof are output.

For example, black seed A0 and associated media $AJ_{11}$, $AJ_{12}$, and $AJ_{13}$ shown in FIG. 2 are output.

Independent Medium Network Construction and Vertex Initial Value Assignment

After the initial seeds and the initial media are determined, one or more independent medium networks can be constructed, and an initial value can be assigned to a vertex in each medium network.

Figure 5:
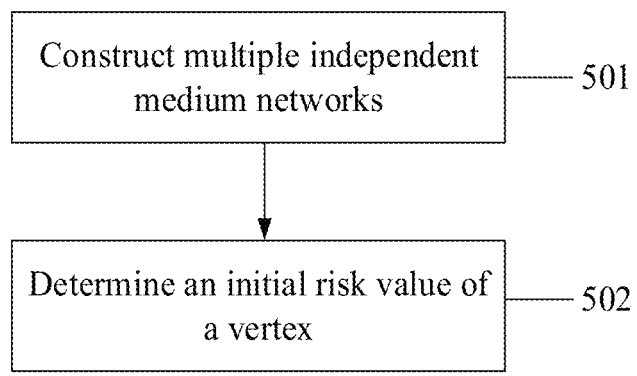
FIG. 5 is a flowchart illustrating a method for assigning an initial value to a vertex according to aspects of the present specification.

FIG. 5 is a flowchart illustrating a method for assigning an initial value to a vertex.

As shown in FIG. 5, step 501: Construct one or more independent medium networks.

Specifically, initial seeds can be classified, and one independent medium network can be constructed for each type of initial seed. For example, one independent medium network can be constructed for one or more black seeds of a bank account type, and one independent medium network can be constructed for one or more black seeds of a mobile number type. Construction of each independent medium network can include: using a black seed as a starting point to first connect the black seed to initial media (media associated with the black seed in the initial media output in step 403) and forming multiple layers of vertices and media through several associated expansions. Specifically, one or more other vertices associated with each upstream vertex (including the seed) by using media can be determined, and the media and the one or more other vertices are added downstream of the upstream vertex. The rest can be deduced from it.

For example, black seed set is $A=\{A_0, A_1, A_2, \ldots, A_n\}$.

Effective medium sets that can be associated with the black seeds are as follows (J, K, L, . . . separately represent different media types):

$$AJ_{nJ}, AK_{nk}, AL_{nL}, \ldots, \text{where } n_J, n_K, n_L \ldots \in Z.$$

Z represents a positive integer.

Figure 6:
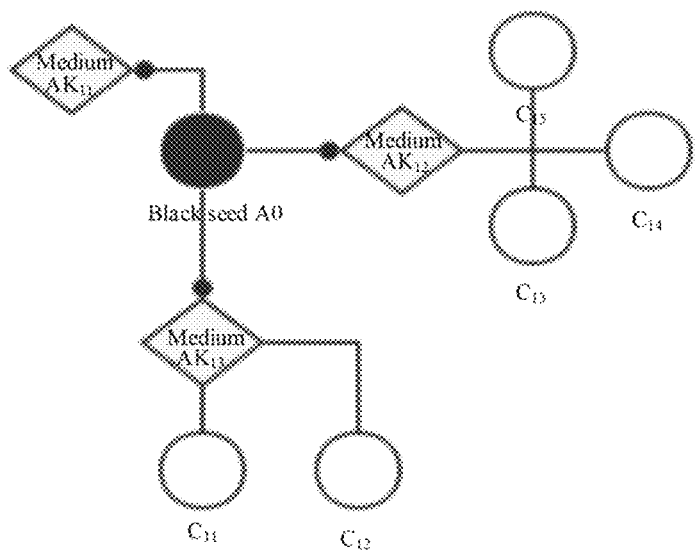
FIG. 6 is a schematic diagram illustrating a wireless medium individual according to aspects of the present specification.

As shown in FIG. 6, medium $AK_{11}$ has no downstream vertex because of having no associated effective content (such as bank card account). Therefore, $AK_{11}$ can be considered as an ineffective medium individual in an effective medium set. An effective medium individual is a subset of the effective medium set: $AJ_{n_j}, AK_{n_k}, AL_{n_l}, \ldots,$ 其中, $n_j, n_k, n_l \ldots \in Z$ $$AJ_{nj} \in AJ_{nJ}, AJ_{nj} \cap AJ_{nJ} = AJ_{nj} \cdot AJ_{nj},$$

$$AK_{n_k}, AL_{n_l}, \ldots, 其中, n_j, n_k, n_l \ldots \in Z$$

A final quantity of expansion vertices of a medium network is associated to quantity S of effective medium individuals and association layer numbers M. Because there may be cross association for the same vertex (see FIG. 3), vertex quantity Q has a lower limit shown in the following equation and an infinite upper limit. In practice research, a quantity of risk-free vertices usually approaches infinity after multiple expansions, but a risky transaction expansion result is usually as follows: a quantity of vertices progressively decreases layer by layer and converges to a fixed constant:

$$\{\min Q \mid 1 \leq \min q \leq M_n\}, Q, M_n \in Z$$

Z represents a positive integer.

Step 502: Determine an initial risk value of a vertex.

In a medium network, medium individuals are not repeated. However, one vertex can have more than one upper-layer medium.

As shown in FIG. 3, vertex $B_{11}$ is connected to two upper-layer media: AM/and $AJ_{13}$. This case can be considered as vertex risk doubling, which is equivalent to existence of two completely different evidences for the same risk fact. In this case, certainty can be correspondingly increased (for example, doubled or logarithmically doubled).

For example, black seed A0 is an ALIPAY account with a mobile number, the mobile number corresponding to the ALIPAY account is associated (for example, has a call history) with vertex $B_{11}$ (another ALIPAY account with a mobile number), and the ALIPAY account has a transfer history with the ALIPAY account of vertex $B_{11}$. In other words, vertex $B_{11}$ is associated with the black seed by using two paths, and therefore a risk value of vertex $B_{11}$ is relatively large. Therefore, the risk value of the vertex $B_{11}$ can be increased correspondingly.

The case in which one vertex is associated with two media is listed above, but other cases are also contemplated in the present specification. For example, if one vertex is associated with more than two media, the media associated with the vertex are located in higher layers from the black seed.

If certain vertex V has X upper-layer media (that is, vertex V is connected to X upper-layer media), initial risk value $R_1(V)$ of vertex V can be calculated as follows:

$$R_1(V) = \ln(X) + 1, X \in Z \qquad (1)$$

Z represents a positive integer set.

As shown in equation (1), R(V) is 1 if X=1, and R(V) is 1.69 if X=2. The rest can be deduced from this.

The logarithmic function in is used in equation (1) to cause a risk value of a vertex to increase as a quantity of upper-layer media connected to the vertex is increased, but finally converge. The risk value represents a high-risk degree. When a risk value of a vertex is generally greater than risk values of other vertices, the vertex already can be determined to be a risky vertex. In practice, generally, if a vertex has a maximum of five upper-layer media, i.e., a risk value 2.6, the vertex can be determined to be a high-risk vertex.

It should be noted that, although equation (1) is given above for the initial risk value of the vertex, other ways of determining the initial risk value are also contemplated in the present specification, for example $R_1(V)=\log(X)+1$, and $R_1(V)=\lg(X)+1$, provided that it is considered that an initial risk value of a vertex increases as a quantity of upper-layer media connected to the vertex is increased.

As described above, multiple mesh medium structures are separately constructed for multiple effective medium sets (each set includes media of the same type) to further calculate an initial risk value of each vertex.

Vertex Customization

After the initial value is assigned to the vertex, more types of other data can be introduced to further optimize the risk value of the vertex. Iteration calculation is performed based on the initial risk value of the vertex.

Figure 7:
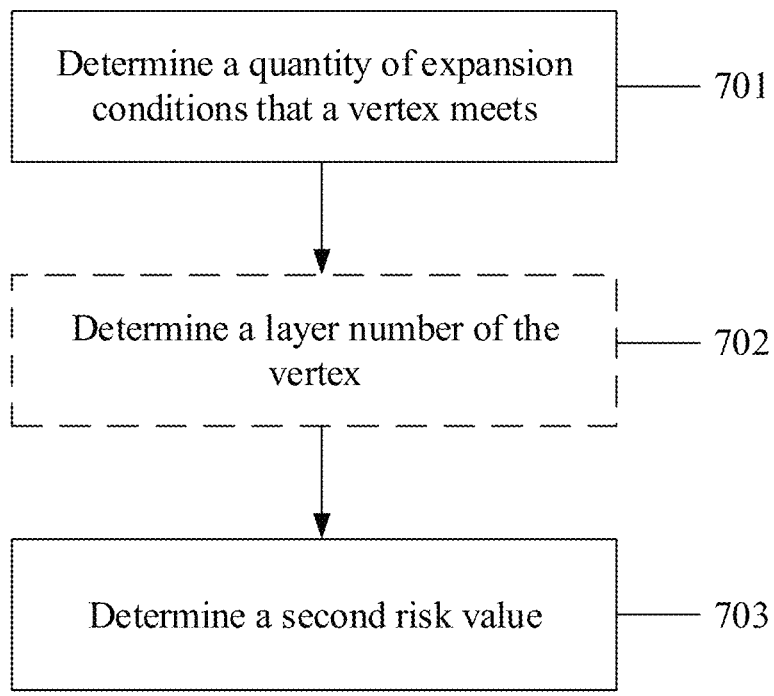
FIG. 7 is a flowchart illustrating a method for optimizing a risk value of a vertex according to aspects of the present specification.

FIG. 7 is a flowchart illustrating a method for optimizing a risk value of a vertex.

Step 701: Determine a quantity of expansion conditions that a vertex meets.

Other expansion conditions can be considered in optimization of a risk value of the vertex. For example, whether the vertex meets the following risk conditions can be considered:

1. Whether the vertex involves other comprehensive risks.

Each vertex in each medium network can include risk values of multiple types of risks. In calculation of a risk value of one of the multiple types of risks, other risks, i.e., associated risks other than the risk currently involved can be considered. These risks may be derived from the current risk, or may coexist with the current risk. For example, in practice, a fraud risk often also involves an impersonation risk, a spam registration risk, a judicial freezing risk, and a social risk. Therefore, in calculation of a fraud risk value of a vertex, whether the vertex meets at least one of the impersonation risk, the spam registration risk, the judicial freezing risk, or the social risk can be considered.

For example, whether the vertex is a high-risk vertex for at least one of the spam registration risk, the judicial freezing risk, or the social risk can be determined. If the vertex is a high-risk vertex for one of the spam registration risk, the judicial freezing risk, or the social risk, it is determined that the vertex involves other comprehensive risks.

2. Whether the vertex has abnormal behavior.

Specifically, abnormal behavior feature analysis can be performed on the vertex. The abnormal behavior includes high-risk fund relationship behavior, shopping life behavior, risk preference behavior, etc. Such behavior analysis is usually helpful for digging a hidden risk.

For example, if a certain bank account usually behaves normally (for example, is usually used for living payment), but suddenly involves a large amount transfer, it can be considered that the bank account has abnormal behavior.

3. Whether a type of the vertex is uncertain, that is, whether the vertex is a vertex with little information.

If the vertex has little information and there is no accurate information for determining, risk mutation often occurs in this case. For example, if an account has neither any historical behavior nor any historical risk, such an account cannot be analyzed deeply. However, the vertex is very prone to risk mutation in a certain period of time.

The three pieces of information available for risk value optimization are listed above, but other expansion information can also be contemplated by a person skilled in the art for risk value optimization.

In optimization of the risk value of the vertex, whether the vertex meets an expansion condition and/or the quantity of expansion conditions that the vertex meets can be considered.

Optional step 702: Determine a layer number of the vertex.

As shown in FIG. 2, a layer number of each vertex is M. Generally, larger M indicates that an association layer that the vertex is located in is farther away from initial seed (black seed) A0 and the risk value decreases. For example, if the black seed represents a convicted fraudster, first-layer vertex $B_1$ represents the fraudster's wife, second-layer vertex $B_2$ represents the wife's brother, and third-layer vertex $B_3$ represents the wife's brother's friend. In this case, as an association layer number is increased, a degree of association between the vertex and the black seed decreases and the risk value decreases.

If a boundary vertex (i.e., the outermost vertex of a medium network, such as $B_{13}$, $B_{14}$, $B_{15}$, $B_{21}$, $B_{22}$, or $B_{23}$) has a larger risk value, it can be considered that all upstream vertices between the boundary vertex and a black seed have larger risk values because the upstream vertices are associated with the black seed to greater degrees. For example, for a fraud risk scenario, if an input initial seed is at medium-low risk, risks progressively decrease through association with different layers of media, and boundary vertices are generally at low risk or generally 'good people'. If the initial seed is at very high risk, the boundary vertices are still at high risk even though several medium expansions are performed.

Therefore, in optimization of the initial risk value, the layer number M of the vertex can be considered. This is described in detail below.

Step 703: Determine a second risk value of the vertex.

In an example, the second risk value can be determined based on the quantity of expansion conditions that the vertex meets and a layer that the vertex is located in.

For example, a second risk value of vertex V can be calculated according to equation (2):

$$R_2(V) = R_1(V)\ln(Y \cdot M + e) \quad (2)$$

Y is a quantity of risk conditions that vertex V meets and M is the layer number of the vertex.

For example, there are three risk conditions. If Y=0, that is, the vertex does not meet any of the risk conditions, the second risk value is equal to an initial risk value. If the vertex meets all the three risk conditions and the vertex is located in layer 5, the second risk value $R_2(V)$ is 2.87 times the initial risk value $R_1(V)$. For a vertex with deep medium expansion (generally, more than three medium expansions are considered as deep expansion), if the vertex is hit by three types of risk conditions, the vertex must be at high risk.

For example, a vertex (located in layer 1) directly associated with an initial seed is naturally at relatively high risk because the vertex is very close to the seed. However, if a vertex is located in layer 4, the vertex is theoretically at low risk because the vertex is relatively far away from the seed, but if the vertex meets multiple risk conditions, a risk value of the vertex can be increased for subsequent adjustment of risk values of upstream vertices, as described below.

Alternatively, the second risk value can be determined based on only the quantity of expansion conditions that the vertex meets without considering the layer that the vertex is located in.

For example, a second risk value of vertex V can be calculated according to equation (3):

$$R_2(V) = R_1(V)\ln(Y + e) \quad (3)$$

Although the function ln( ) is used in the above equations (2) and (3) to determine the second risk value, the second risk value can be determined in other ways provided that the risk value is adjusted based on an expansion condition that the vertex meets and in some implementations based on the layer that the vertex is located in.

Multi-Network Stacking

The risk value of the vertex is determined for each independent medium network, but vertices in different medium networks may overlap. For example, a bank account vertex of an entity is located in a first medium network (bank transfer medium network) and a mobile number vertex of the entity is located in a second medium network (mobile phone communications medium network), and the vertices of the entity in the two medium networks overlap when the first medium network and the second medium network are stacked.

In practice, a difference between a quantity of medium high-risk vertices and a quantity of risk-free or low-risk vertices is that the former is finite and the latter is infinite. When vertices in different medium networks overlap, a risk value of such a vertex increases. For example, if the same vertex is obtained through expansion by using a mobile communications medium and a bank transfer medium, the possibility that the vertex is at high risk increases.

Figure 8:
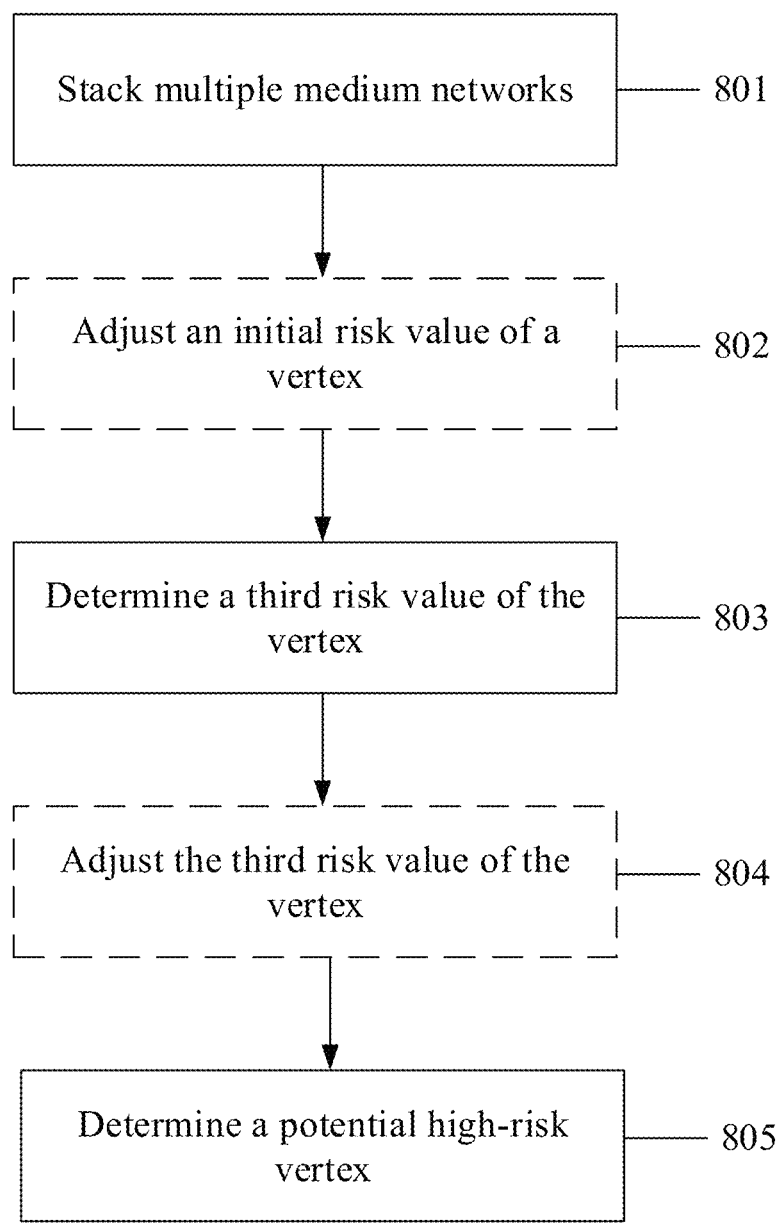
FIG. 8 is a flowchart illustrating a method for calculating a risk value of a vertex in a stacked medium network according to aspects of the present specification.

FIG. 8 is a flowchart illustrating a method for calculating a risk value of a vertex in a stacked medium network.

Step 801: Stack multiple medium networks by combining overlapped vertices in different medium networks.

When vertices in different medium networks overlap, vertices representing the same entity in different medium networks can be combined into one vertex to stack multiple medium networks. For example, a bank account vertex of an entity is located in a first medium network (bank transfer medium network) and a mobile number vertex of the entity is located in a second medium network (mobile communications medium network), and corresponding vertices in the first medium network and the second medium network can be combined when the first medium network and the second medium network are stacked.

Figure 10:
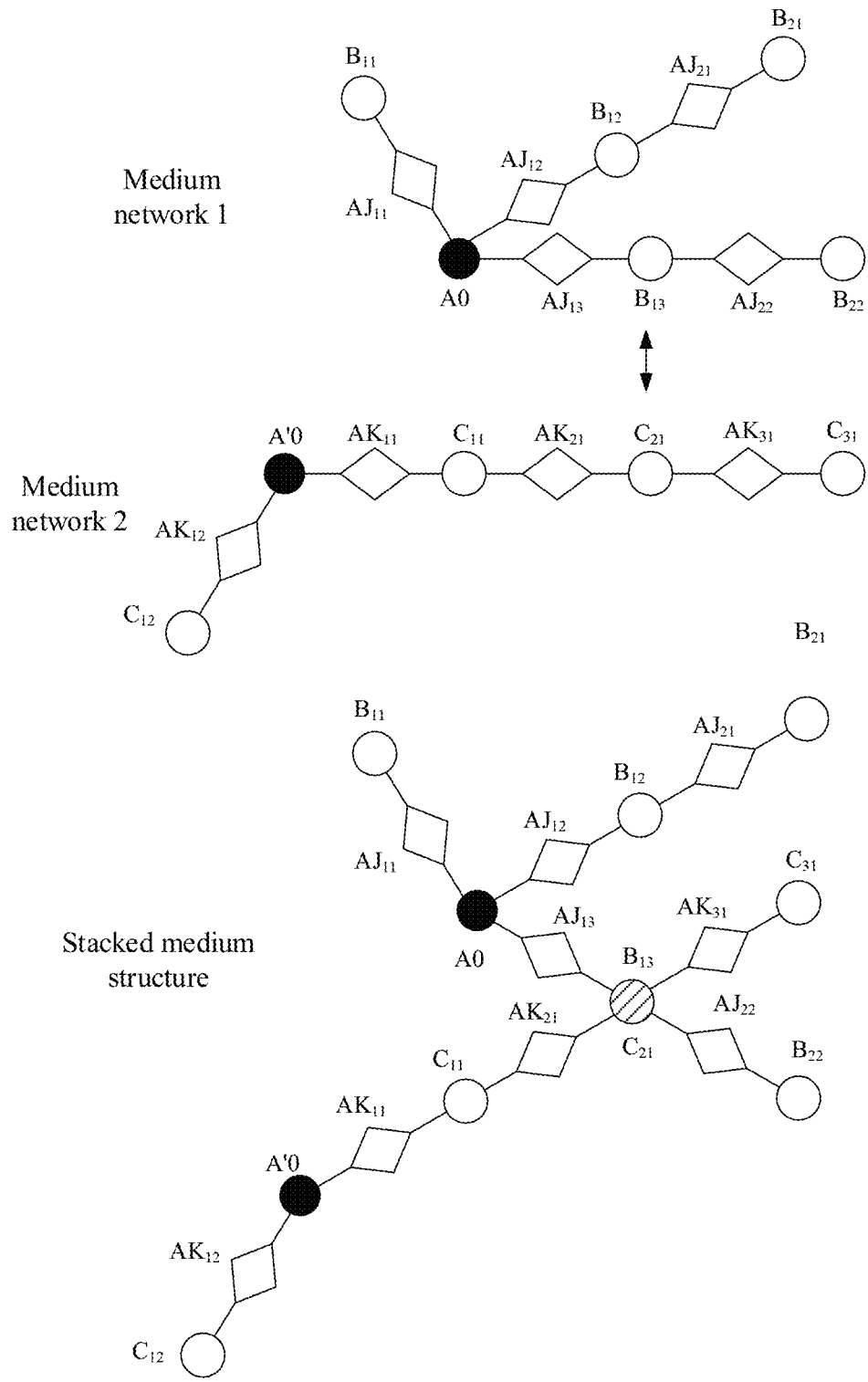
FIG. 10 is a schematic diagram illustrating stacking two medium networks according to an implementation.

FIG. 10 is a schematic diagram illustrating stacking two medium networks according to an implementation.

As shown in FIG. 10, medium network 1 includes black seed A0, and vertex $B_{13}$ associated with black seed A0 by using medium $AJ_{13}$ is obtained by expanding the black seed.

Medium network 2 includes black seed A0', and vertex $C_{21}$ is obtained through expansion by using medium $AK_{11}$, vertex CH, and medium $AK_{21}$.

Vertex $B_{13}$ and vertex $C_{21}$ represent the same entity, for example, are bank accounts, WeChat accounts, mobile numbers representing the same entity. Vertex $B_{13}$ and vertex $C_{21}$ can be combined into one vertex when medium network 1 and medium network 2 are stacked as a stacked media structure.

Optional step 802: Adjust a risk value of a vertex in a stacked medium network structure.

A boundary vertex is a vertex without a downstream vertex, and the boundary vertex usually should be a vertex with the smallest risk value on the path.

Generally, a risk value of a boundary vertex in a medium network is smaller than a risk value of each upstream vertex. However, after multiple medium networks are stacked, a risk value of a boundary vertex may be greater than a risk value of an upstream vertex. In particular, if a layer of the vertex is considered in calculation of a second risk value of the vertex, that is, the second risk value is calculated by using equation (2), a second risk value of a downstream vertex is increased relative to a second risk value of an upstream vertex. Therefore, a risk value of each vertex needs to be adjusted after the medium networks are stacked.

For example, second risk values of vertices in the medium network can be sorted. If a risk value of a boundary vertex is higher than the lowest value (for example, 1), a risk value of each upstream vertex of the boundary vertex is compared with the risk value, and if the risk value of the upstream vertex is smaller than the risk value of the boundary vertex, the risk value of the upstream vertex is increased to at least the risk value of the boundary vertex, to correct a risk value of each vertex on the path.

For example, if a black seed represents a convicted fraudster, first-layer $B_1$ represents the fraudster's wife, second-layer $B_2$ represents the wife's brother, and third-layer $B_3$ represents the wife's brother's friend. If a second risk value of brother's friend $B_3$ is greater than a second risk value of at least one of upstream $B_1$ or $B_2$, $B_1$ or $B_2$ can be correspondingly increased to at least the value of $B_3$. As such, the risk value of the boundary vertex is not greater than the risk value of the upstream vertex in the medium network.

The adjustment of the risk value of the vertex in the stacked medium network structure herein can be performed in combination with the calculation of the second risk value of the vertex according to equation (2) (that is, the layer number of the vertex is considered in the calculation). In practice, a vertex with a small layer number, for example, first-layer vertex V1 associated with an initial seed, naturally has a relatively high risk degree because the vertex is very close to the seed. If fourth-layer vertex V4 is obtained through expansion, the vertex is theoretically at low risk because the vertex is already very far away from the seed, but if V4 is hit by multiple risks, a risk value of V4 is greatly increased when a second risk value is calculated ($R_2(V)=R_1(V)\ln(4Y+e)$). Risk values of all vertices on the entire path are correspondingly increased when the risk value of the vertex in the stacked medium network structure is adjusted in step 802.

Step 803: Determine a third risk value based on a quantity of overlapping times of the vertex.

Assume that S independent medium networks can be stacked. If certain vertex Vis located in two independent medium networks, a quantity of overlapping times of the vertex is 2. If the vertex is located in one medium network, a quantity of overlapping times of the vertex is 1. The quantity of overlapping times is not limited by a medium network layer that the vertex is located in. If the quantity of overlapping times is set to Z, a third risk value of vertex V can be calculated as follows:

$$R_3(V) = R_2(V) \cdot Z \qquad (4)$$

$1 \leq Z \leq S-1$, and $R_2(V)$ means weighted summation of second risk values of vertex V in all the independent medium networks.

Specifically, if $R_{21}(V), R_{22}(V), \ldots R_{2S}(V)$ are the second risk values of vertex V in the S independent medium networks, $R_2(V)$ in equation (4) can be calculated as follows:

$$R_2(V) = \omega_1 \cdot R_{21}(V) + \omega_2 \cdot R_{22}(V) + \ldots + \omega_s \cdot R_{2s}(V) \qquad (5)$$

Weights $\omega_1$, $\omega_2$, and $\omega_S$ each are a weight of one risk value. Values of weights $\omega_1$, $\omega_2$, and $\omega_S$ can be selected based on actual needs.

In an example, a relatively large weight can be assigned to a primary risk. For example, if a risk value of an embezzlement risk is currently calculated, a weight of a risk value of the embezzlement risk in the multiple medium networks can be relatively large.

In another example, the same weight value can be simply assigned to the risk values in the medium networks, that is, $R_2(V)$ is an average of $R_{21}(V), R_{22}(V), \ldots R_{2S}(V)$.

The third risk value can be used as a final risk value of the vertex to determine a high-risk vertex.

Optional step 804: Adjust the third risk value of the vertex in the stacked medium network structure.

After a third risk value of each vertex is determined, the third risk value of each vertex on the path can be further adjusted to obtain a final risk value. That is, if a risk value of an upstream vertex is smaller than a risk value of a boundary vertex, the risk value of the upstream vertex is increased to at least the risk value of the boundary vertex, to correct the risk value of each vertex on the path. This is similar to step 802.

Step 805: Determine a potential high-risk vertex.

Risk values of all vertices can be arranged in descending order, and x % of the vertices in the front of the order can be extracted as potential high-risk vertices for prior risk control.

The high-risk vertices can be directly incorporated into the black seed pool for subsequent use. A value of x can be determined by analyzing value distribution and with reference to expert's experience and manual sampling-based verification. Entities represented by vertices with different risk values can be managed in layers.

Figure 9:
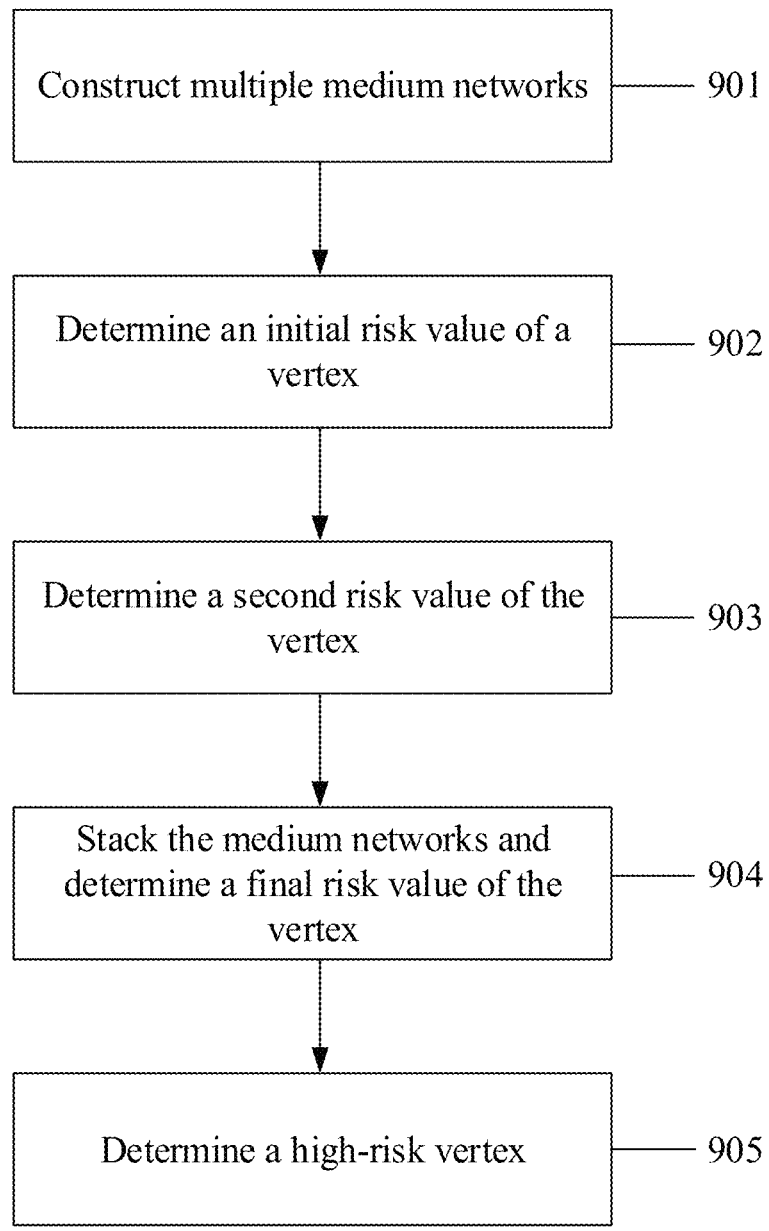
FIG. 9 is a flowchart illustrating a method for identifying risky vertices according to the present specification.

FIG. 9 is a flowchart illustrating a method for identifying risky vertices according to the present specification.

Step 901: Construct multiple medium networks.

Each of the multiple medium networks is constructed from one or more black seeds of the same type and includes vertices and media connected to the vertices. This is described above with respect to step 501 in FIG. 5.

Step 902: Determine an initial risk value of each vertex based on a quantity of upper-layer media connected to the vertex. This is described above with respect to step 502 in FIG. 5.

Step 903: Determine a second risk value of each vertex based on a quantity of risk conditions that the vertex meets and the initial risk value. This is described above with respect to FIG. 7.

Step 904: Stack the multiple medium networks, and obtain a final risk value of each vertex in a stacked medium network structure. This is described above with respect to FIG. 8.

Step 905: Determine a high-risk vertex based on the final risk value. This is described above with respect to step 804 in FIG. 8.

The descriptions set forth herein with reference to the accompanying drawings describe example configurations without representing all examples that can be implemented or fall within the scope of the claims. The term "example" used herein means "used as an example, an instance, or an explanation" and does not mean "better than" or "preferable than other examples". The detailed descriptions include details to provide an understanding of the described technologies. However, these technologies can be practiced without these details. In some examples, well-known structures and devices are shown in block diagram forms to avoid blurring the concepts of the described examples.

In the accompanying drawings, similar components or features can have the same reference sign. Furthermore, components of the same type can be distinguished from each other by following reference signs with dashes and second signs for distinguishing between similar components. If only first reference signs are used in the specification, the description can be applied to any of similar components with the same first reference sign regardless of second reference signs.

Various illustrative blocks and modules described with reference to the present disclosure can be implemented or executed by using general-purpose processors, DSPs, ASICs, FPGAs or other programmable logic devices, discrete gates or transistor logic, or discrete hardware components designed to perform the functions described herein, or any combination thereof. The general-purpose processor can be a microprocessor, but in an alternative solution, the processor can be any conventional processor, controller, microcontroller, or state machine. The processor can alternatively be implemented as a combination of computing devices (for example, a combination of a DSP and a microprocessor, multiple microprocessors, one or more microprocessors collaborative with a DSP core, or any other such configuration).

The functions described herein can be implemented in hardware, processor-executed software, firmware, or any combination thereof. If the functions are implemented in processor-executed software, the functions each can be stored in or transmitted by using a computer-readable medium as one or more instructions or code. Other examples and implementations fall within the scope of the present disclosure and the appended claims. For example, due to the nature of software, the functions described above can be implemented by using processor-executed software, hardware, firmware, a hardwire, or any combination thereof. Features implementing the functions can alternatively be physically located at various locations, including being distributed so that parts of the functions are implemented at different physical locations. In addition, as used herein (including the claims), "or" used in item enumeration (for example, item enumeration with words such as "at least one of" or "one or more of") indicates inclusive enumeration so that enumeration such as at least one of A, B, or C means A, B, C, AB, AC, BC, or ABC (i.e., A, B, and C). Similarly, as used herein, the phrase "based on" should not be interpreted as a reference to a closed condition set. For example, an example step described as "based on condition A" can be based on both condition A and condition B without departing from the scope of the present disclosure. In other words, as used herein, the phrase "based on" should be interpreted in the same way as the phrase "at least partially based on".

The computer-readable medium includes both a non-transitory computer storage medium and a communications medium, and includes any medium that facilitates transfer of a computer program from one place to another. The non-transient storage medium can be any available media that can be accessed by a general-purpose or dedicated computer. By way of example and not limitation, the non-transitory computer-readable medium can include a RAM, a ROM, an electrically erasable programmable read-only memory (EEPROM), a compact disk (CD) ROM or other optical disk storages, a magnetic disk storage or other magnetic storage devices, or any other non-transitory media that can be used to carry or store desired program code means in the form of instructions or data structures and that can be accessed by a general-purpose or dedicated computer or a general-purpose or dedicated processor. Any connection is also properly referred to as a computer-readable medium. For example, if software is transmitted from a website, a server, or another remote source by using a coaxial cable, a fiber optic cable, a twisted pair, a digital subscriber line (DSL), or a wireless technology such as infrared, radio, and microwave, the coaxial cable, the fiber optic cable, the twisted pair, the digital subscriber line (DSL), or the wireless technology such as infrared, radio, and microwave is included in the definition of the medium. The disk (disk) and disc (disc) used herein include a CD, a laser disc, an optical disc, a digital versatile disc (DVD), a floppy disk, and a Blu-ray disc. The disk often magnetically reproduces data, and the disc optically reproduces data with lasers. A combination of the above media is also included in the scope of the computer-readable medium.

The descriptions herein are provided to cause a person skilled in the art to make or use the present disclosure. Various modifications to the present disclosure will be clear to a person skilled in the art, and the universal principles defined herein can be applied to other variations without departing from the scope of the present disclosure. Therefore, the present disclosure is not limited to the examples and designs described herein, but should be granted the widest scope consistent with the principles and novel features disclosed herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for identifying a risky vertex, comprising:
constructing and updating a plurality of medium networks in parallel, each of the medium networks being constructed and updated in real-time, using a different set of processors, clusters, or virtual machines, based on one or more black seeds of a same type and including vertices and media connected to the vertices, wherein each vertex identifies an entity in an interaction;
determining a first risk value of each vertex based on a quantity of one or more upper-layer media connected to the vertex and a quantity of one or more risk conditions that the vertex meets;
stacking the plurality of medium networks to generate a stacked medium network structure;
determining a final risk value of each vertex based on a quantity of one or more overlapping times of the vertex in the stacked medium network structure and the first risk value; and
determining a high-risk vertex based on the final risk value prior to a transaction associated with the high-risk vertex.

2. The method according to claim 1, wherein the constructing the plurality of medium networks includes:
- generating one or more initial seeds;
- matching media in a medium pool with the one or more initial seeds to generate one or more initial media; and
- outputting the one or more initial seeds and the one or more initial media to construct the medium networks.

3. The method according to claim 2, wherein the matching the media in the medium pool with the one or more initial seeds includes:
- determining whether each medium of the media is associated with one or more of the one or more initial seeds;
- determining a ratio between a quantity of the one or more initial seeds associated with the medium and a total quantity of the one or more initial seeds; and
- determining the medium to be an initial seed if the ratio is greater than a threshold.

4. The method according to claim 1, wherein the determining the first risk value of each vertex based on the quantity of one or more upper-layer media connected to the vertex and the quantity of one or more risk conditions that the vertex meets includes:
- determining an initial risk value of each vertex based on the quantity of one or more upper-layer media connected to the vertex; and
- determining a second risk value of each vertex based on the quantity of one or more risk conditions that the vertex meets and the initial risk value.

5. The method according to claim 4, wherein the initial risk value of the vertex is a logarithmic function of the quantity of one or more upper-layer media connected to the vertex.

6. The method according to claim 4, wherein the determining the second risk value of each vertex based on the quantity of one or more risk conditions that the vertex meets includes:
- determining the quantity of one or more risk conditions that the vertex meets; and
- determining the second risk value of the vertex based on the quantity of one or more risk conditions that the vertex meets and the initial risk value.

7. The method according to claim 6, wherein the determining the second risk value of the vertex based on the quantity of one or more risk conditions that the vertex meets and the initial risk value further includes:
- determining a layer number of the vertex; and
- determining the second risk value of the vertex based on the layer number of the vertex, the quantity of one or more risk conditions that the vertex meets, and the initial risk value.

8. The method according to claim 7, wherein the layer number of the vertex is a quantity of media between the vertex and at least one of the one or more black seeds.

9. The method according to claim 7, further comprising:
- comparing a risk value of each boundary vertex with risk values of upstream vertices of the boundary vertex; and
- responsive to determining that the risk value of the boundary vertex is greater than a risk value of any of the upstream vertices, adjusting the risk values of the upstream vertices of the boundary vertex to cause each of the risk values of the upstream vertices to be greater than or equal to the risk value of the boundary vertex.

10. The method according to claim 1, wherein the obtaining the final risk value of each vertex in the stacked medium network includes:
- increasing a risk value of an overlapped vertex based on a quantity of overlapping times of the vertex.

11. An apparatus for identifying risky vertices, comprising:
- a module configured to construct and update a plurality of medium networks in parallel, each of the medium networks being constructed and updated in real-time, using a different set of processors, clusters, or virtual machines, based on one or more black seeds of a same type and including vertices and media connected to the vertices, wherein each vertex corresponds to an entity in an interaction;
- a module configured to determine a first risk value of each vertex based on a quantity of one or more upper-layer media connected to the vertex and a quantity of one or more risk conditions that the vertex meets;
- a module configured to stack the multiple medium networks to generate a stacked medium network structure;
- a module configured to determine a final risk value of each vertex based on a quantity of one or more overlapping times of the vertex in the stacked medium network structure and the first risk value; and
- a module configured to determine a high-risk vertex based on the final risk value prior to a transaction associated with the high-risk vertex.

12. The apparatus according to claim 11, wherein the module configured to construct the plurality of medium networks includes:
- a module configured to generate one or more initial seeds;
- a module configured to match media in a medium pool with the one or more initial seeds to generate one or more initial media; and
- a module configured to output the one or more initial seeds and the one or more initial media to construct the medium networks.

13. The apparatus according to claim 12, wherein the module configured to match the media in the medium pool with the one or more initial seeds includes:
- a module configured to determine whether each medium of the media is associated with one or more of the one or more initial seeds;
- a module configured to determine a ratio between a quantity of the one or more initial seeds associated with the medium and a total quantity of the one or more initial seeds; and
- a module configured to determine the medium to be an initial seed if the ratio is greater than a threshold.

14. The apparatus according to claim 11, wherein the module configured to determine the first risk value of each vertex based on the quantity of one or more upper-layer media connected to the vertex and the quantity of one or more risk conditions that the vertex meets includes:
- a module configured to determine an initial risk value of each vertex based on the quantity of one or more upper-layer media connected to the vertex; and
- a module configured to determine a second risk value of each vertex based on the quantity of one or more risk conditions that the vertex meets and the initial risk value.

15. The apparatus according to claim 14, wherein the initial risk value of the vertex is a logarithmic function of the quantity of one or more upper-layer media connected to the vertex.

16. The apparatus according to claim 14, wherein the module configured to determine the second risk value of each vertex based on the quantity of one or more risk conditions that the vertex meets includes:
- a module configured to determine the quantity of one or more risk conditions that the vertex meets; and a module configured to determine the second risk value of the vertex based on the quantity of one or more risk conditions that the vertex meets and the initial risk value.

17. The apparatus according to claim 16, wherein the module configured to determine the second risk value of the vertex based on the quantity of one or more risk conditions that the vertex meets and the initial risk value further includes:
 a module configured to determine a layer number of the vertex; and
 a module configured to determine the second risk value of the vertex based on the layer number of the vertex, the quantity of one or more risk conditions that the vertex meets, and the initial risk value.

18. The apparatus according to claim 17, wherein the layer number of the vertex is a quantity of media between the vertex and at least one of the one or more black seeds.

19. The apparatus according to claim 17, further comprising:
 a module configured to compare a risk value of each boundary vertex with risk values of upstream vertices of the boundary vertex; and
 a module configured to: responsive to determining that the risk value of the boundary vertex is greater than a risk value of any of the upstream vertices, adjust the risk values of the upstream vertices of the boundary vertex to cause each of the risk values of the upstream vertices to be greater than or equal to the risk value of the boundary vertex.

20. The apparatus according to claim 11, wherein the module configured to obtain the final risk value of each vertex in the stacked medium network includes:
 a module configured to increase a risk value of an overlapped vertex based on a quantity of overlapping times of the vertex.

21. A computer device, comprising:
 a processor; and
 a memory arranged to store computer executable instructions, the processor being caused to perform the following operations when the executable instructions are executed:
  causing construction and updating of a plurality of medium networks in parallel, each of the medium networks being constructed and updated in real-time, using a different set of processors, clusters, or virtual machines, based on one or more black seeds of a same type and including vertices and media connected to the vertices, wherein each vertex corresponds to an entity in an interaction;
  determining a first risk value of each vertex based on a quantity of one or more upper-layer media connected to the vertex and a quantity of one or more risk conditions that the vertex meets;
  stacking the plurality of medium networks to generate a stacked medium network structure;
  determining a final risk value of each vertex based on a quantity of one or more overlapping times of the vertex in the stacked medium network structure and the first risk value; and
  determining a high-risk vertex based on the final risk value prior to a transaction associated with the high-risk vertex.

* * * * *